(No Model.)

J. BUCKLEY.
LUBRICATOR.

No. 585,426.   Patented June 29, 1897.

Witnesses:
G. Willard Rich.
J. H. Sutherland

Inventor,
John Buckley
by Church & Church
his attys.

THE NORRIS PETERS CO., PHOTO-LITHO., WASHINGTON, D. C.

UNITED STATES PATENT OFFICE.

JOHN BUCKLEY, OF ROCHESTER, NEW YORK, ASSIGNOR TO THE ROCHESTER AUTOMATIC LUBRICATOR COMPANY, OF SAME PLACE.

LUBRICATOR.

SPECIFICATION forming part of Letters Patent No. 585,426, dated June 29, 1897.

Application filed August 15, 1896. Serial No. 602,868. (No model.)

*To all whom it may concern:*

Be it known that I, JOHN BUCKLEY, of Rochester, in the county of Monroe and State of New York, have invented certain new and useful Improvements in Lubricators; and I do hereby declare the following to be a full, clear, and exact description of the same, reference being had to the accompanying drawings, forming a part of this specification, and to the reference-numerals marked thereon.

My invention has for its object to provide a device adapted to be used in connection with lubricators whereby the amount of oil or lubricant fed may be readily observed, and while particularly adapted for force-feed lubricators is capable of being used in other connections; and it consists in certain improvements hereinafter described, the novel features being pointed out in the claim at the end of this specification.

Figure 1:
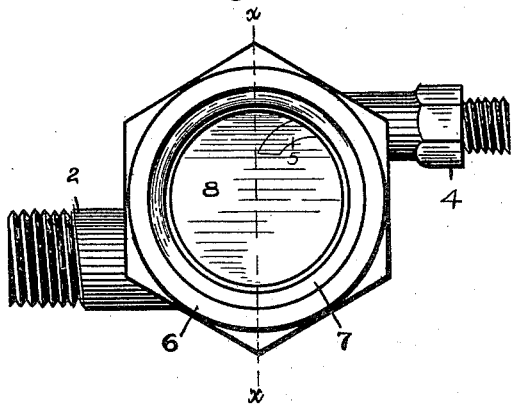
Figure 2:
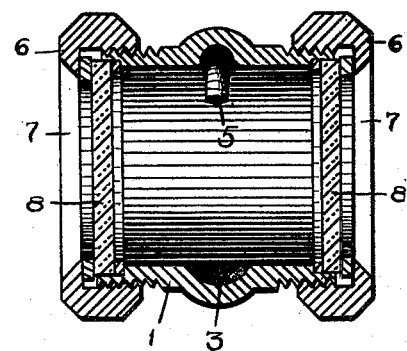
Figure 3:
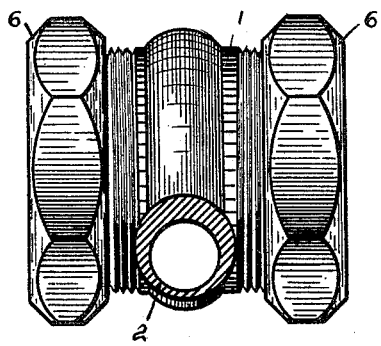
Figure 4:
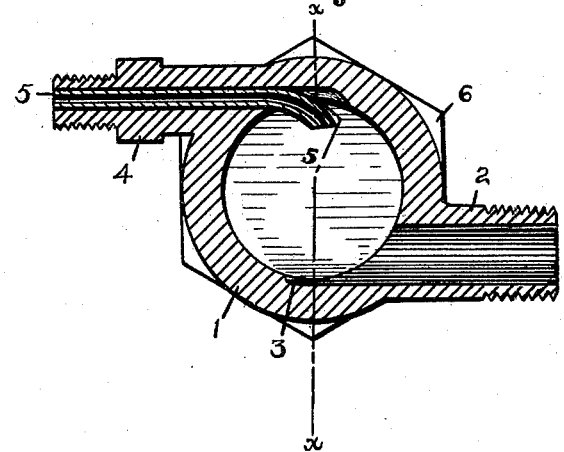

In the drawings, Figure 1 is a side elevation of my improvement; Fig. 2, a vertical sectional view on the line *x x* of Fig. 1; Fig. 3, an end elevation; Fig. 4, a longitudinal sectional view.

Similar reference-numerals indicate similar parts.

The attachment is composed of a cylindrical body 1, having at one side, preferably the lower, a pipe extension 2, threaded for the application of a pipe leading to the part to be lubricated, said extension being bored out or otherwise formed in such manner that a shallow groove 3 is formed in the bottom of the cylindrical chamber, as in Figs. 2 and 4, to lead the oil dropping through the chamber to the steam-pipe or elsewhere.

4 indicates an extension formed upon the body 1 on the opposite side of the cylindrical chamber from the extension 2, (and in the present embodiment projecting in the opposite direction.) A channel is formed longitudinally in the extension 4, preferably by boring, entering the chamber at its upper portion, and through this channel extends a small pipe 5, preferably secured by being driven in tightly and having its inner end bent down after being introduced within the cylindrical body to form a nipple, from which the oil drops into the recess 3 at the bottom of the chamber and passes out.

It will be noted that the apertures through the pipe extensions enter the interior of the body tangentially, so that the boring operation will form the grooves or channels in the top and bottom of the chamber, and thereby not only facilitate the construction of the device, but also enable it to be so small that it can be inserted in a practically horizontal pipe.

The ends of the body 1 are provided with the threads upon which are nuts 6, having overhanging flanges 7 for confining the glasses 8 in place, suitable packing-rings 9 being interposed between the glasses and the body and nuts, as shown.

The manner of using this attachment will be apparent to those skilled in the art, the oil entering the pipe 5 from any suitable supply, preferably a force-feed lubricator, and dropping from the end of the nipple into the groove 3, passing out to the steam-pipe or other place of use, the glasses permitting the flow to be observed in the usual manner. The aperture in the pipe extension 2 is preferably relatively large, so that if the oil is to be fed into a steam-pipe against pressure a free circulation of steam is permitted in the chamber and the exit of the oil will not be interfered with.

Instead of feeding the oil by gravity down through the chamber the device could be reversed, and if the chamber were filled with water the oil could rise from the nipple through it in the form of drops and pass out through the pipe extension 4, the amount of oil passing being readily observed, but I prefer to use it in the manner described.

This attachment can be made at slight cost and without the necessity of employing the expensive cylindrical glasses ordinarily used and may be arranged anywhere between the feed and place of use desired, the difference in the level between the entrance and exit pipes being very slight.

I claim as my invention—

In a sight-feed device adapted for insertion in oil-feeding pipes, the combination with the cylindrical body open at opposite ends and having the lateral pipe extensions on opposite sides of the central portion and extending tangentially therefrom, of the small pipe extending through one extension and bent toward the center of the body to form a nipple, and the horizontal groove formed in the interior of the body opposite said nipple communicating with the aperture in the pipe extension on that side, the flat glasses at the end of the body and the nuts screwing on the body for holding the glasses in place and in alinement with the nipple, substantially as described.

JOHN BUCKLEY.

Witnesses:
HAMPDEN HYDE,
GEORGE W. PALMER.